Patented Nov. 9, 1937

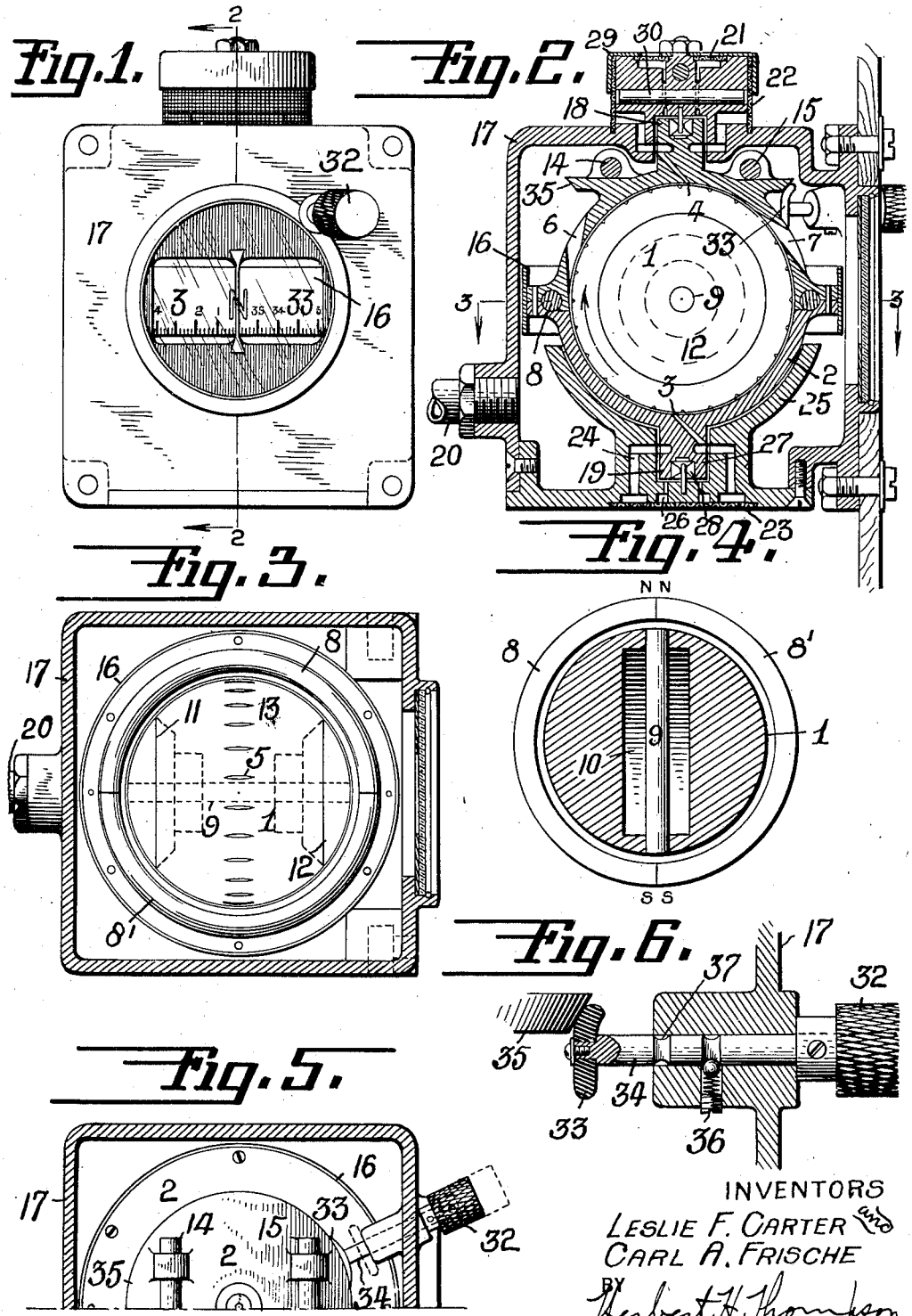

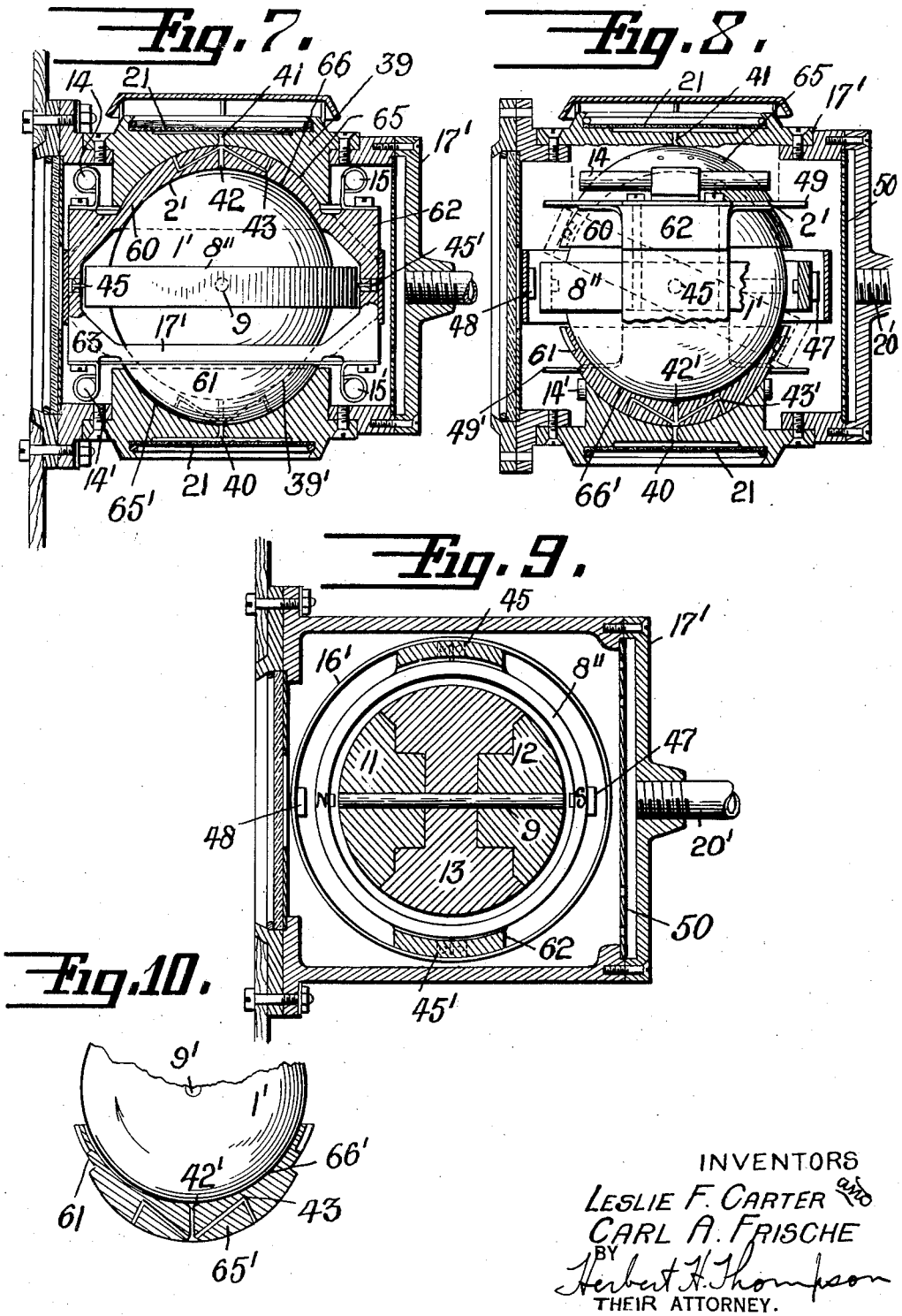

2,098,564

UNITED STATES PATENT OFFICE 2,098,564

MAGNETIC DIRECTIONAL GYROSCOPE

Leslie F. Carter and Carl A. Frische, Leonia, N. J., assignors to Sperry Gyroscope Company, Inc., Brooklyn, N. Y., a corporation of New York Application October 11, 1934, Serial No. 747,859
Renewed April 2, 1937

11 Claims. (Cl. 33—222)

This invention relates to directional gyroscopes for high speed, light weight, dirigible craft, such as aircraft, and more specifically to a combined magnetic and gyroscopic device of this character which embodies the meridian seeking properties of a compass and the steadiness and direction keeping properties of a gyroscope. We are aware that some of the advantages of a magnetic-gyroscopic combination have heretofore been appreciated and attempts made to coerce the gyroscope from the magnetic compass by a system of relays and torque applying devices. Such devices are, however, complicated, fragile and likely to get out of order, and act in only one direction, that is, the magnetic compass coerces the gyroscope, but the latter has no effect in azimuth on the former. According to our invention, no such relays or other devices are necessary, the magnets of the magnetic compass being mounted on a part of the gyroscopic instrument itself and exerting a direct meridian seeking torque thereon.

We are also aware that it has been proposed to use a gyroscopic compass as an aircraft instrument, which in itself possesses meridian seeking properties, and in one such case it was proposed to employ a magnet to couple a ball rotor of a gyroscopic compass to the supporting cup. We do not consider the gyroscopic compass practical for airplane use, however, on account of the high speed of airplanes, which gives rise to extremely large ballistic deflections and changes of settling point for changes of course. In our device, therefore, the magnetic system is used primarily as the north-seeking element of the compass and no attempt is made to impart meridian seeking properties to the gyroscope itself except as the slave of the magnetic compass.

A further object of our invention is to improve the construction of directional gyroscopes by employing an air spun, air supported ball as the rotor, whereby three degrees of freedom are obtained without the use of gimbals, pivots, or rotor bearings.

Referring to the drawings showing several forms our invention may assume,

Fig. 1 is a front elevation of our magnetic directional gyroscope.

Fig. 2 is a vertical section of the same on line 2—2 of Fig. 1.

Fig. 3 is a horizontal section of the same on line 3—3 of Fig. 2, the ball rotor or gyroscope being shown, however, in plan.

Fig. 4 is a view of the magnetic system in plan, the ball being shown in section.

Fig. 5 is a top plan view of the gyroscope within the casing, the walls of the latter being shown in section.

Fig. 6 is a detail of the setting mechanism that may be employed, if desired.

Fig. 7 is a vertical section through a modified or preferred form of our invention.

Fig. 8 is a similar view in which the gyroscopic element has been turned at right angles to Fig. 7.

Fig. 9 is a horizontal section of the same.

Fig. 10 is a detail of the supporting cup for the ball gyroscope, illustrating the manner of imparting the spin.

For the gyroscopic element of our invention we prefer to use a ball or sphere type rotor 1 which is preferably enclosed more or less completely by hollow sphere or shell 2. Air for spinning the rotor is introduced through nozzles 3 and 4 at the top and bottom thereof, which may direct air streams more or less tangentially against the periphery of the rotor. If desired, the rotor may have shallow notches 5 cut therein to increase the efficiency of the spinning means. The rotor is floated or supported entirely by the air film between it and the shell or carrier 2, which film is in part provided by the spinning jets and in part is self generated, the air escaping through ports 6 and 7.

Casing 2 preferably has an equatorial steel ring around the same, which is permanently magnetized with a north pole at one side and a south pole at the opposite side. This ring may be made as two semi-circular rings 8 and 8' with the two north poles adjacent and the two south poles adjacent, as shown in Fig. 4, or it may be merely a closed ring 8" which is magnetized with the north pole at one side and the south pole at the other, as in Fig. 9.

The ball itself has along the spin axis thereof a soft iron rod 9, the ends of which normally lie adjacent the aforementioned poles. The ball also is given a major axis of rotation by giving it a greater moment of inertia about said axis than about any other axis, which may be accomplished by providing the ball with an interior axial bore 10, as in Figs. 3 and 4, or by providing it with inserted end pieces 11, 12 of lighter material than the body of the ball 13, as partially shown in Fig. 3 and more completely shown in Fig. 9.

The shell 2 may have additional magnets 14 and 15 mounted thereon to give additional meridian seeking properties. It is also shown as having secured thereto a compass card 16, which may be of any suitable form. Said shell 2 is also shown as mounted for rotation about a vertical axis within the outer fixed casing 17 by means of vertical guide bearings 18 and 19.

Preferably the spinning air is taken in through both bearings, which air also serves to float the shell 2 between air lubricated bearings. It is obvious that either positive or negative air pressure may be employed. We have illustrated the latter, in which the outer casing 17 is continuously evacuated by a pump (not shown) through pipe 20. Air enters said casing through top and bottom screens 21, 22 and 23. Referring to the bottom bearing, a portion of the air passes through passages 24 and escapes between the flaring cup 25, formed on or secured to the interior of the casing 17, and the rotatable shell 2. The shell is thus floated on an air film within cup 25 and friction is reduced to a minimum. Another portion of said incoming air enters through passages 26 and also assists in supporting the weight of the cup, acting on the bottom of the guide stem 27 extending downwardly therefrom. A small jeweled guide pivot 28 may be provided for centering the bearing. The top construction is similar. The cap 29 may also contain compensating magnetic bars 30 and 31. In this form of the invention no bearing cup 25 is provided at the top.

For setting the gyroscope in starting up, a setting knob 32 may be provided. When said knob is pushed in to the position shown in Fig. 6, a soft rubber disc 33 on the shaft 34 thereof engages a beveled annulus 35 on the shell 2 so that by rotating the knob the shell may be revolved to the desired N—S position prior to starting up the gyroscope, which will carry the ball with it since, without an air supply, the ball rests firmly in the bottom of the shell. When the knob 32 is pulled outwardly so that the spring pressed ball 36 enters the notch 37, disc 33 is disengaged from 35 and the magnetic compass is free.

In the form shown in Figs. 7 to 10, the vertical guide bearings of Fig. 2 are replaced by spherical bearings or cups 39, 39' formed on the interior of the top and bottom of the outer casing 17'. The centers of curvature of these bearings are vertically aligned, but do not coincide, so that the cup or shell member 2' in this instance is not only rotatably supported in said bearings, but centered without guide bearings. In this case the air enters at the top and bottom through screens 21 and through apertures 40, 41. A portion of said air escapes between the spherical bearings 39 and 39' and the spherically shaped exterior or buttons 66 and 66' on shell 2', so that the cup is floated at top and bottom on air bearings and cannot bounce out or fall out. Another portion of said air passes through the cup member through radial passages 42 and 42'. Part of said air may be led off through passages 43 back between the cup and bearing members to supply additional supporting air. The main portion of said air, however, escapes between the ball 1' and the bearing cups 66 and 66' at the top and bottom. Preferably the centers of curvature of the cups are offset laterally slightly to reduce the clearance on the right hand side (for example) of the ball at the bottom (see Fig. 10) and on the opposite side at the top, so that the greater part of said air passes out in a clockwise direction (if that is the direction of spin desired), thereby both floating the ball and spinning it clockwise without the use of a tangential nozzle.

The shell in this instance is made in upper and lower halves 60 and 61 connected by spaced portions 62, 63, thus providing ample room for the escape of the spinning air. In this instance, also, the major magnetic system comprising the ring 8'' is pivoted within the shell and between parts 62 and 63 on horizontal pivots 45, 45' which lie normal to the N—S pole, i. e., E—W. Therefore the ring is free to tilt up or down with the gyroscope. This allows banking or pitching of the airplane on any heading without exerting any torque on the gyroscope, about the horizontal axis. As is well known, however, a balanced magnetic needle has a pronounced dip in most latitudes so that if the ring 8' were balanced about the axis 45, 45', the north end would tend to dip through a large angle. We counter-balance this by a weight 47, as is done in most magnetic compasses. Such a weight, however, gives rise in the ordinary magnetic compass to a marked deviation or turning error due to lateral acceleration pressures on turns, and we propose to compensate for this by securing a counterbalancing weight 48 to the supporting shell 2' or to the card 16' secured thereto. In this manner the turning error is avoided in a manner not possible in the ordinary magnetic compass.

The additional magnets in this instance are shown as four in number, 14, 15, 14', 15', mounted on the top and bottom and two sides of the cup member 2'. Baffles 49, 49' may also be secured to said magnets to prevent the air escaping from the bearings from disturbing the instrument. Preferably, also a perforated plate 50 is interposed between the outlet pipe 20' and the casing so that no air disturbance or suction is localized at any one point.

The operation of our invention is as follows: Assuming the instrument to be operating and that the gyroscope tends to slowly wander in one direction from the magnetic meridian, as the soft iron core 9' is turned away from the poles N and S a torque will be applied about the vertical axis of the gyroscope, causing a tendency of the gyroscope to precess at right angles thereto—in other words, to tilt. In the form shown in Figs. 7 to 9, the ring 8' will tilt with the gyroscope so that no torque from that cause is exerted downwardly on the gyroscope. However, there exists a strong centralizing coupling between the ball and the vertical plane of the spinning air in both forms of the invention which acts to directly reduce and eliminate any tilt of the ball without setting up oscillations. The result is that the gyroscope will be moved slowly in the direction of the applied magnetic force and will turn back into the magnetic meridian. Such action is made slow so that the gyroscope will be uninfluenced by temporary oscillations or deviations of the magnetic compass. In addition, the northerly turning error of the magnetic compass is reduced in our invention by the compensating arrangement shown in Fig. 9. Furthermore, since the position of the ball spin axis stabilizes the shell 2 or 2' in azimuth, temporary deviations of the magnetic system are prevented, so that the card 16 remains on the true magnetic meridian. Also, the yielding magnetic coupling between the ball and support quickly damps out nutation of the ball due to the inertia of the magnet ring and shell.

In accordance with the provisions of the patent statutes, we have herein described the principle and operation of our invention, together with the apparatus which we now consider to represent the best embodiment thereof, but we desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described our invention what we claim and desire to secure by Letters Patent is:

1. A magnetic directional gyroscope comprising a ball gyroscope, a carrier therefor rotatable about a vertical axis, a permanent magnet carried by said carrier, air means for spinning and supporting said ball within said carrier on an additional horizontal axis, a magnetic member on said carrier around said ball, and a soft iron core having no permanent magnetism along the spin axis of the ball, whereby the device will seek the magnetic meridian.

2. In a magnetic slave gyroscope, a rotatable shell or cup, a magnet thereon subject to the earth's field for turning said shell in response to said field, and a ball gyroscope, air supported and spun in said shell, said ball having a part of great magnetic permeability, along its spin axis, said part having no permanent magnetism and adapted to remain adjacent the poles of said magnet, whereby deviation of the gyroscope from the magnetic meridian is prevented and temporary oscillations of the magnet avoided.

3. In a ball directional gyroscope, a rotatable shell, a ball closely surrounded thereby and supported therein both above and below, there being an upper and a lower air port through the shell for supplying air between the shell and ball to spin and universally support the ball, the centers of curvature of the shell at top and bottom being offset oppositely from the center of the ball and in the plane of spin to spin and support the ball.

4. In a magnetic slave gyroscope, a shell mounted for rotation about a vertical axis, a magnetic element pivoted therein on an E—W axis with its poles substantially N—S, a ball gyroscope air supported in said shell, and having soft iron pole pieces normally lying adjacent the poles of said element, and an air jet in said shell for spinning said ball about a normally N—S horizontal axis.

5. Air bearings for supporting the rotatable shell of a ball directional gyroscope, the combination with the outer casing and shell, spaced upper and lower cup shaped members in said casing, spaced spherically shaped buttons on said shell seated within said cup members, the center of curvature of said members being vertically aligned and spaced, whereby freedom about only the vertical axis is provided and means whereby continuous air flow may be provided between each member and cooperating button.

6. In a ball directional gyroscope, a casing, a shell, said casing and shell being adapted to provide upper and lower spherical air bearings between the shell and casing having vertically spaced centers of curvature, whereby the shell is mounted with freedom about the vertical axis, a ball within the shell, there being means for conducting air under pressure between the ball and shell to spin and support said ball.

7. In a ball directional gyroscope, a casing, a shell, said casing and shell being adapted to provide upper and lower spherical air bearings between the shell and casing having vertically spaced centers of curvature, whereby the shell is mounted with freedom about the vertical axis, a ball within the shell, said shell providing upper and lower cups for the ball, said cups being slightly offset laterally in a vertical plane, and each cup having a substantially radial air port therethrough whereby the ball is both air spun and air supported.

8. In a magnetic slave gyroscope, a shell mounted for rotation about a vertical axis, a magnetic element pivoted therein on an E—W axis with its poles substantially N—S, and a ball gyroscope air supported in said shell, and having soft iron pole pieces normally lying adjacent the poles of said element, there being means in said shell whereby said ball is spun about the N—S axis of the shell.

9. In a magnetic slave gyroscope, a shell mounted for rotation about a vertical axis, a magnetic element pivoted therein on an E—W axis with its poles substantially N—S, a mass on the south side of said element to balance the dip of the earth's magnetic field, a counter-balancing mass on the north side of the shell, and a ball gyroscope air supported in said shell, and having soft iron pole pieces normally lying adjacent the poles of said element, there being means in said shell whereby said ball is spun about the N—S axis of the shell.

10. In a ball directional gyroscope, a rotatable shell having at least the upper and lower portions thereof of spherical shape both inside and out, a ball supported therein both at top and bottom, upper and lower air ports through the shell for supplying air between the shell and ball to both spin and universally support the ball, a closed casing for the gyroscope having cups at least top and bottom within which said shell portions are mounted for rotation about a vertical axis, and means for exhausting the air from said casing, said casing having admission ports through said cups adjacent said ports in said shell to supply air thereto, and also to air-float the shell within said cups in the casing.

11. A ball directional gyroscope as claimed in claim 10, having baffle plates within the casing adjacent the points of air emergence to avoid disturbing air pressures on the gyroscope.

LESLIE F. CARTER.
CARL A. FRISCHE.